US012748649B2

(12) United States Patent
Kotary et al.

(10) Patent No.: US 12,748,649 B2
(45) Date of Patent: Sep. 29, 2026

(54) AUTOMATIC RECOVERY OF NODE RESOURCE MEMORY DEVICES

(71) Applicant: Microsoft Technology Licensing, LLC, Redmond, WA (US)

(72) Inventors: Karunakara Kotary, Redmond, WA (US); Santosh Srinivas Rao Deshpande, Bengaluru (IN); Sagar Chandrakant Pawar, Bengaluru (IN); Ravi Kumar Siadri, Visakhapatnam (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/783,172

(22) Filed: Jul. 24, 2024

(65) Prior Publication Data

US 2026/0030085 A1 Jan. 29, 2026

(51) Int. Cl.
*G06F 11/00* (2006.01)
*G06F 11/07* (2006.01)
*G06F 11/14* (2006.01)

(52) U.S. Cl.
CPC ........ *G06F 11/0772* (2013.01); *G06F 11/079* (2013.01); *G06F 11/1417* (2013.01)

(58) Field of Classification Search
CPC ............... G06F 11/0772; G06F 11/079; G06F 11/1417; G06F 11/0787; G06F 11/073; G06F 11/0709
See application file for complete search history.

(56) References Cited

U.S. PATENT DOCUMENTS

| | | | | |
|---|---|---|---|---|
| 7,404,118 | B1 * | 7/2008 | Baguette | G06F 11/1044 714/E11.041 |
| 9,817,727 | B2 * | 11/2017 | McAlister | G06F 11/3006 |
| 9,891,996 | B2 * | 2/2018 | Gopal | G06F 11/1417 |
| 10,162,715 | B1 * | 12/2018 | MacDonald McAlister | G06F 11/1451 |
| 10,831,606 | B2 * | 11/2020 | Bodner | G06F 8/61 |
| 11,070,419 | B2 * | 7/2021 | Palavalli | G06F 11/14 |
| 11,429,490 | B1 * | 8/2022 | Sayyed | G06F 9/4416 |
| 11,669,398 | B2 * | 6/2023 | Cadloni | G06F 11/1068 714/6.11 |
| 12,423,196 | B1 * | 9/2025 | Rajgaria | G06F 11/2053 |

(Continued)

OTHER PUBLICATIONS

International Search Report and Written Opinion received for PCT Application No. PCT/US2025/034412, Nov. 17, 2025, 13 pages.

*Primary Examiner* — Jonathan D Gibson

(57) ABSTRACT

Systems and methods are provided for automatic recovery of node resource memory devices. A platform basic input/output system ("BIOS") of a node collects, from a node resource of the node, operational state information for memory components of a memory device, and determines whether at least one memory component is undetected. If so, the platform BIOS sends a notification of the undetected memory component(s) to a controller of the node that relays the notification to a control plane fabric ("CPF") agent in a control plane. The CPF agent automatically determines a potential cause and a potential resolution, including memory device reset, firmware updates, etc. The CPF agent sends commands to the controller that cause the platform BIOS to initiate a recovery process for the plurality of memory components of the memory device, based on the potential resolution.

20 Claims, 9 Drawing Sheets

(56) References Cited

U.S. PATENT DOCUMENTS

| | | | | |
|---|---|---|---|---|
| 2012/0159238 | A1* | 6/2012 | Wang | G06F 11/1425<br>714/6.1 |
| 2019/0056984 | A1* | 2/2019 | Teshome | G06F 11/0757 |
| 2019/0236277 | A1* | 8/2019 | Chang | G06F 21/64 |
| 2020/0036575 | A1* | 1/2020 | Palavalli | G06F 16/27 |
| 2020/0089569 | A1* | 3/2020 | Cadloni | G06F 11/1012 |
| 2021/0240561 | A1* | 8/2021 | Shah | G06F 11/0793 |
| 2021/0279145 | A1* | 9/2021 | Dings | G06F 11/0709 |
| 2023/0236939 | A1* | 7/2023 | Mufti | G06F 11/1469<br>707/675 |

* cited by examiner

AUTOMATIC RECOVERY OF NODE RESOURCE MEMORY DEVICES

BACKGROUND

For new memory interface technologies and system architectures, there is growing demand for storing and processing increasing amounts of data. However, when there is an issue with at least one memory device hosted by a node resource (e.g., a compute express link ("CXL") resource, a compute resource, or a memory resource) of a node in a data center, all memory devices hosted by the node resource are disabled. The node subsequently boots with a reduced capacity, which causes a repair state condition in which the node is shut down and awaiting diagnosis and repair by a service provider agent or technician. This leads to reductions in overall resource capacity. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for automatic recovery of node resource memory devices. A platform basic input/output system ("BIOS") of a node collects, from a node resource of the node, first information associated with operational states of a plurality of memory components of a memory device. The platform BIOS determines whether at least one memory component among the plurality of memory components is undetected, by comparing the first information with second information associated with a resource inventory corresponding to the plurality of memory components of the memory device. Based on a determination that at least one memory component is undetected, the platform BIOS sends a first notification to a controller (e.g., a baseboard management controller ("BMC")) of the node, the first notification indicating that the at least one memory component is undetected. The controller provides a first signal to a control plane fabric ("CPF") agent in a control plane, the first signal being based on the first notification and indicating that the at least one memory component is undetected. The controller receives a first set of commands from the CPF agent, the first set of commands being based on a determination by the CPF agent regarding resolution to the at least one memory component being undetected. The controller sends a second set of commands to the platform BIOS, based on the first set of commands. The platform BIOS initiates a recovery process for the plurality of memory components of the memory device, based on the second set of commands. In this manner, the system can automatically detect health issues of the memory components based on telemetry data (e.g., the collected first information), automatically determine resolutions, and automatically commands actions to be taken to recover the memory components, without having to set the nodes or node resources in a repair state (which requires time, expense, and inefficiencies related with diagnosis and repair by a service provider agent or technician). Further, recovery by the system results in reduced downtime, thus leading to increased overall system efficiencies and to maintained capacity of the node resources.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

DETAILED DESCRIPTION OF CERTAIN EMBODIMENTS

Figure 1:
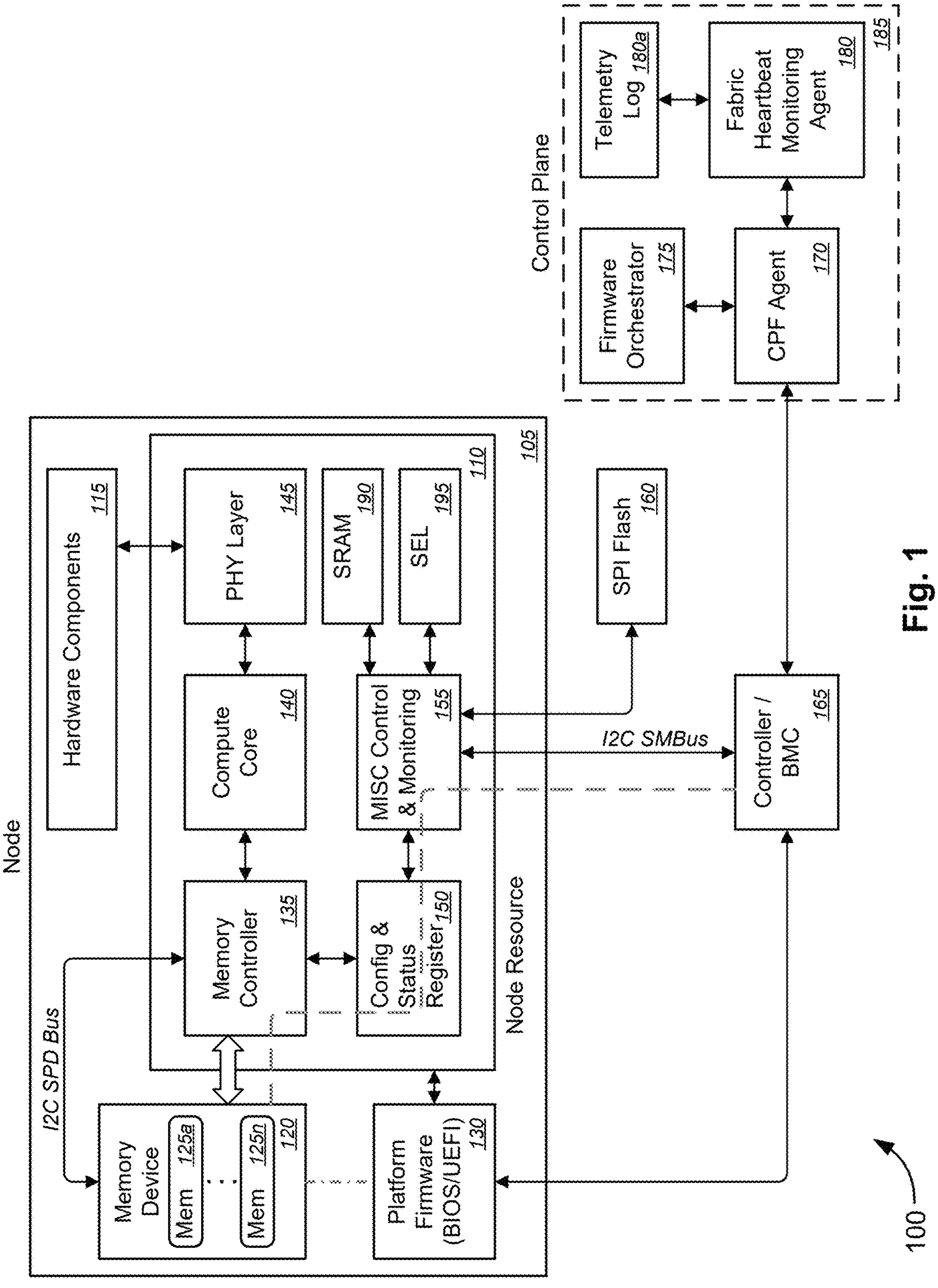
FIG. 1 depicts an example system for implementing automatic recovery of node resource memory devices.

As described briefly above, for node resources (e.g., a CXL resource, a compute resource, or a memory resource) in a node in a data center, when there is an issue with at least one memory device hosted by the node resource, all memory devices hosted by the node resource are disabled, with the node being placed in a repair state condition. In the repair state condition, the node is shut down and remains non-operational until diagnosis and repair is performed by a service provider agent or technician. For example, for a CXL device, a firmware of the CXL device is responsible for initializing and training memory (e.g., dual in-line memory modules ("DIMMs")) hosted by the CXL device. However, if any CXL DIMM fails to initialize, the CXL firmware disables all DIMMS that are hosted by the CXL device, which causes the system to boot with reduced capacity. Because of the reduced capacity, the system is pushed into a repair state condition, which leads to capacity reductions in the overall system. Although firmware updates or memory retraining usually recovers the failing CXL DIMMs, existing systems require manual diagnosis and repair by a service provider agent or technician.

The present technology provides for automatic recovery of node resource memory devices. As described herein, the present technology is directed to a CPF agent-assisted automatic recovery of failing node resource memory components and/or a failing node resource, by analyzing health signals and/or health data (e.g., as telemetry data) of the node resource memory devices and/or the node resource. During boot, the platform firmware (e.g., platform BIOS) detects the specific node resource memory components (e.g., CXL DIMMs) that are failing or in an unhealthy state, and sends specific health data and, in some cases, remediation steps to the control plane. A CPF agent decodes the health data, determines recovery actions to recover the failing node resource memory components, and sends instructions to the platform firmware. The recovery actions include resetting the failing node resource memory components and/or failing node resource, with or without training of the node resource memory components after reset. The recovery actions further include updating firmware of the failing node resource memory components and/or failing node resource, in some cases, followed by reset with training. In this manner, resource capacity of the node resources is maintained (e.g., with prolonged reduced capacity being avoided), while overall system efficiencies are increased.

Various modifications and additions can be made to the embodiments discussed herein without departing from the scope of the disclosed techniques. For example, while the embodiments described above refer to particular features, the scope of the disclosed techniques also includes embodiments having different combinations of features and embodiments that do not include all of the above-described features.

Turning to the embodiments as illustrated by the drawings, FIGS. 1-5 illustrate some of the features of methods, systems, and apparatuses for implementing automatic recovery of node resource memory devices, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing automatic recovery of node resource memory devices. System 100 includes a node 105, a node resource 110, hardware components 115 of the node 105, a memory device 120 (including a plurality of memory components 125*a*-125*n*), and a platform firmware 130 (e.g., a BIOS). Herein, although the various embodiments refer to use of a BIOS, the various embodiments are not so limited, and a unified extensible firmware interface ("UEFI") may be used instead. UEFI, as used herein, refers to a specification that defines architecture of a platform firmware that is used for booting computer hardware and its interface for interaction with an operating system ("OS") of the node 105, or refers to the interface itself. In examples, the node resource 110 includes a memory controller 135, a compute core 140, and a physical ("PHY") layer 145. In some examples, the node resource 110 further includes a Configuration and Status Register 150 and a miscellaneous control and monitoring system 155. In examples, the system 100 further includes a serial peripheral interface ("SPI") flash memory 160, a controller 165 (e.g., a BMC), a CPF agent 170, a firmware orchestrator 175, a fabric heartbeat monitoring agent 180, and a telemetry log 180*a*. In some examples, the CPF agent 170, the firmware orchestrator 175, the fabric heartbeat monitoring agent 180, and the telemetry log 180*a* are disposed in a control plane 185. In examples, the system 100 further includes a static random access memory ("SRAM") or other memory 190 and a system event log ("SEL") 195, either or both of which are disposed in node 105 and/or node resource 110.

In examples, the node 105 includes a server, a compute node, or a memory node. The node resource 110, in some examples, includes one of a cache-coherent interconnect resource, a compute resource, or a memory resource. In some cases, the cache-coherent interconnect resource is part of one or both of the compute resource or the memory resource. In some examples, the cache-coherent interconnect resource includes at least one of a CXL resource, a coherent accelerator processor interface ("CAPI") resource, or a cache coherence interconnect for accelerators ("CCIX") resource. In examples, the compute resource includes at least one of a graphics processing unit ("GPU")-based resource, a central processing unit ("CPU")-based resource, a neural processing unit ("NPU")-based resource, or a smart network interface card ("SmartNIC")-based resource. In some examples, the memory resource includes at least one of a CXL memory-based resource, a random access memory ("RAM")-based resource, a DIMM-based resource, or a high bandwidth memory ("HBM")-based resource. In examples, the RAM-based resource includes at least one of an SRAM-based resource, a dynamic RAM ("DRAM")-based resource, a synchronous dynamic RAM ("SDRAM")-based resource, a double data rate ("DDR") memory-based resource, a low-power DDR ("LPDDR") SDRAM, a graphics DDR ("GDDR") memory-based resource, and/or a GDDR SDRAM-based resource. In some examples, the node resource 110 includes a device that is operationally critical, though not boot critical, and that has a large amount of memory behind the device. In some instances, the device includes a CXL device, a CXL memory expansion card, a GPU device, a resource CPU device (for providing CPU functionality for external requesting devices in contrast to a host CPU of the node 105 that provides host functionality for the node itself), other peripheral component interconnect ("PCI") devices, a smart network interface card ("SmartNIC"), or an artificial intelligence ("AI") accelerator. In some instances, the node resource 110 and/or each memory component 125 is a field-replaceable unit ("FRU"), which is a component that is configured to be quickly and easily removed from the node 105 and/or from the memory device 120, respectively. In examples, memory components 125*a*-125*n* of the memory device 120 include CXL memory, DIMMs, DDR memory components (e.g., DDR, LPDDR SDRAM, GDDR, or GDDR SDRAM memory), local memory, HBM, or other memory.

In some examples, the memory controller 135 communicatively couples with, and manages the memory devices 120 (and corresponding memory components 125*a*-125*n*), as depicted in FIG. 1 by double-headed arrows between memory controller 135 and memory device 120, one of which includes an inter-integrated circuit ("I2C") serial presence detect ("SPD") bus. The I2C SPD bus is a two-line serial protocol that is used to communicate between two devices in an embedded system (in some cases, with one line used for a clock and the other line used for data) and that enables detection or determination of information (e.g., what memory is present, what memory timings to use to access the memory, what speed the memory supports, what technology the memory supports, and what vendor is associated with the memory). In examples, the compute core 140 is an interface between the memory controller 135 and the PHY layer 145 (as depicted in FIG. 1 by the double-headed arrows between the compute core 140 and each of the memory controller 135 and the PHY layer 145), while the PHY layer 145 provides a physical connection between the node resource 110 and the hardware components 115 (as depicted in FIG. 1 by the double-headed arrows between these components of node 105). In some cases, the hardware components 115 includes physical memory devices or physical disk drives, power supplies, the host CPU(s), motherboard, cooling devices, communications ports and interfaces, or other physical hardware. In some instances, the Configuration and Status Register 150 stores information regarding configuration and status of the memory device 120 and/or the memory components 125*a*-125*n*. In some examples, the miscellaneous control and monitoring system 155 interacts with (as depicted in FIG. 1 by double-headed arrows connecting with), and passes control instructions/commands and monitoring signals between or among, the controller 165, the Configuration and Status Register 150, the SPI flash 160, and, in some cases, the SRAM 190 and the SEL 195 as well. In some cases, the connection between the miscellaneous control and monitoring system 155 and the controller 165 includes an I2C system management bus ("SMBus").

In examples, the platform firmware 130 communicates with and controls the node resource 105, while communicating with the controller 165 (as depicted in FIG. 1 by double-headed arrows connecting these components of system 100). The controller 165, in turn, communicates with control plane 185, in particular, with CPF agent 170, which communicatively couples with firmware orchestrator 175, fabric heartbeat monitoring agent 180, and telemetry log 180*a* (via the fabric heartbeat monitoring agent 180). The firmware orchestrator 175 is used for updating the platform firmware 130 (e.g., the firmware of the node 105 or the firmware of the node resource 110) and/or the firmware of the memory device 120 or memory components 125*a*-125*n*, and is further used to generate firmware update commands as well as firmware payloads for the firmware update commands. The fabric heartbeat monitoring agent 180 is used for health monitoring, in some cases, by determining whether a device (e.g., memory device or memory component) is detectable by the host system (in this case, the node 105 or the node resource 110), e.g., based on the telemetry data that is received as a SEL log or a telemetry log by the CPF agent 170 from the controller 165. In some examples, the CPF agent 170 determines if a firmware issue (e.g., firmware not being flashed correctly) is detected, by reading firmware specific details via a PCI bus or a management component transport protocol ("MCTP") bus or by looking for specific signals (e.g., telemetry data) indicative of correct firmware flash or that firmware flash was successful. In examples, CPF agent 170 looks for a flag. If a flag is not received from the host (in this case the node 105 or the node resource 110), then the CPF agent 170 attempts to obtain the information. If the CPF agent 170 is not able to obtain the information, then the CPF agent 170 determines either that the firmware is not flashed or, if flashed, either the activation has issues or the firmware itself is corrupted. For firmware issues, the CPF agent 170 (in some cases working with firmware orchestrator 175) causes the BMC to initiate a firmware update.

In operation, at least the controller (or BMC) 165, the platform firmware 130, and/or the CPF agent 170 may be used to perform methods for implementing automatic recovery of node resource memory devices, as described in detail with respect to FIGS. 2A-4C. For example, the example sequence flow 200 as described below with respect to FIGS. 2A-2C, the example sequence flow 300 as described below with respect to FIG. 3, and the example method 400 as described below with respect to FIGS. 4A-4C may be applied with respect to the operations of system 100 of FIG. 1.

In some aspects, where the node resource 110 is a CXL device, the memory device 120 is a CXL memory, the memory components 125*a*-125*n* are DIMMs, and the platform firmware 130 is a CXL device firmware, the compute core 140 includes a CXL arbitrator and multiplexer ("ARB/MUX"), a CXL cache memory buffer ("CXL.MEM"), and a CXL input/output buffer ("CXL.IO"). The CXL ARB/MUX dynamically multiplexes data from multiple protocols (e.g., CXL.MEM and CXL.IO) and routes the data to the PHY layer 145. When the node 105 boots up and the CXL device (e.g., node resource 110) powers up and starts running its firmware (e.g., platform firmware 130 or platform BIOS), the CXL device firmware runs and initializes the CXL memory (e.g., memory device 120) and the DIMMs (e.g., memory components 125*a*-125*n*). The platform BIOS enumerates the CXL memory and collects information regarding the DIMMs from the CXL device (e.g., via memory controller 135 or directly from CXL memory (as depicted in FIG. 1, by the dash-dot line between memory device 120 and platform firmware 130)). When the platform BIOS detects a missing DIMM(s) from the CXL memory, the platform BIOS collects one or more reasons for the missing DIMM(s) from the CXL memory. Subsequently, the platform BIOS pushes the information regarding the DIMMs to a BMC (e.g., controller 165). In the case that a missing DIMM(s) is detected, the platform BIOS informs the BMC (e.g., via the connection between the platform firmware 130 and the controller 165) and awaits a response from the BMC. In some examples, the information regarding the DIMMs (including detection of the missing DIMM(s) and the collected one or more reasons for the missing DIMM(s)) is passed through memory controller 135 (in some cases, via the I2C SPD Bus), and stored in the Configuration and Status Register 150, before passing through the miscellaneous control and monitoring system 155, and to the BMC (in some cases, via the I2C SMBus). This flow is depicted in FIG. 1 by the long-dashed line from the memory device 120, through the memory controller 135, the Configuration and Status Register 150, the miscellaneous control and monitoring system 155, to the controller 165.

The BMC signals the missing DIMM(s) to a CPF agent (e.g., CPF agent 170), in some cases, as a SEL or telemetry log (e.g., for saving in or retrieving from a system event log or a telemetry log corresponding to the SEL 195 or the telemetry log 180*a*, respectively). In examples, the CPF agent decodes the information regarding the missing DIMM (s) and checks a recovery catalog for entering into a recovery flow. The CPF agent informs a fabric heartbeat monitor agent (e.g., fabric heartbeat monitoring agent 180) regarding node 105 or node resource 110 being in a recovery state.

In the case that the CPF agent determines that missing DIMM(s) is likely due to a potential cause corresponding to a fault code that can be resolved with retraining of the CXL memory, then the CPF agent initiates a recovery with CXL memory reset (e.g., similar to Node Resource Reset 250 of FIG. 2B, as described in detail below). For the recovery with CXL memory reset, the CPF agent sends a reset command for resetting the CXL memory and for retraining the CXL memory to the BMC. The BMC relays the command to the platform BIOS. The platform BIOS resets the DIMMs and retrains the DIMMs. In the case that the platform BIOS detects the previously missing or undetected DIMMs, the platform BIOS adds the information regarding the newly detected DIMMs to an available system memory configuration (e.g., in the Configuration and Status Register 150). The platform BIOS subsequently reports the status to the BMC, in some cases, via a SEL log. The BMC relays the status to the CPF agent, in some cases, via a SEL log or a telemetry log. The CPF agent informs the fabric heartbeat monitor agent regarding the node recovery being complete.

The node boots to OS and starts running workloads using the CXL device and the DIMMs.

In the case that the CPF agent determines that missing DIMM(s) is likely due to a potential cause corresponding to a fault code that can be resolved with a CXL firmware update, then the CPF agent initiates a recovery with CXL firmware update (e.g., similar to Node Resource Firmware Update 264 of FIG. 2C, as described in detail below). For the recovery with CXL firmware update, the CPF agent sends a CXL firmware update command and a CXL memory retraining command to the BMC. The CPF agent also sends a firmware payload to the BMC. In examples, the firmware orchestrator 175 is used by the CPF agent to generate the CXL firmware update command and/or the firmware payload. The BMC updates the CXL firmware (e.g., the platform BIOS) and/or updates the firmware of the DIMMs (either just the missing DIMMs or all the DIMMs communicatively coupled to the memory controller), in some cases, by reflashing the firmware. The BMC instructs the platform BIOS to reset and retrain the CXL memory. The platform BIOS resets the DIMMs and retrains the DIMMs. In examples, the links (e.g., PCI or PCI express ("PCIe") links) are also trained. In the case that the platform BIOS detects the previously missing or undetected DIMMs, the platform BIOS adds the information regarding the newly detected DIMMs to an available system memory configuration (e.g., in the Configuration and Status Register 150). The platform BIOS subsequently reports the status to the BMC, in some cases, via a SEL log. The BMC relays the status to the CPF agent, in some cases, via a SEL log or a telemetry log. The CPF agent informs the fabric heartbeat monitor agent regarding the node recovery being complete. The node boots to OS and starts running workloads using the CXL device and the DIMMs.

In an aspect, the BMC passes configuration information of the DIMMs to the CPF agent, which compares real-time data received from the DIMMs through the BMC and other components (as described above and as shown, e.g., in FIG. 1). The CPF agent determines whether there are any missing DIMMS based on the comparison. If there is a mismatch in terms of a DIMM(s) not being present, the CPF agent identifies and pinpoints what is missing or which configuration issue is detected. In examples, the CPF agent flags whether a speed mismatch is observed (e.g., desired DIMM speed compared with detected DIMM speed), whether desired DIMMs are missing, and/or whether the DIMM speed is not trained. To address these issues, the CPF agent causes the firmware to update and the node resource to be activated, and subsequently checks whether the DIMMs are correctly recovered and/or whether the CXL device is fully recovered.

Figure 2A:
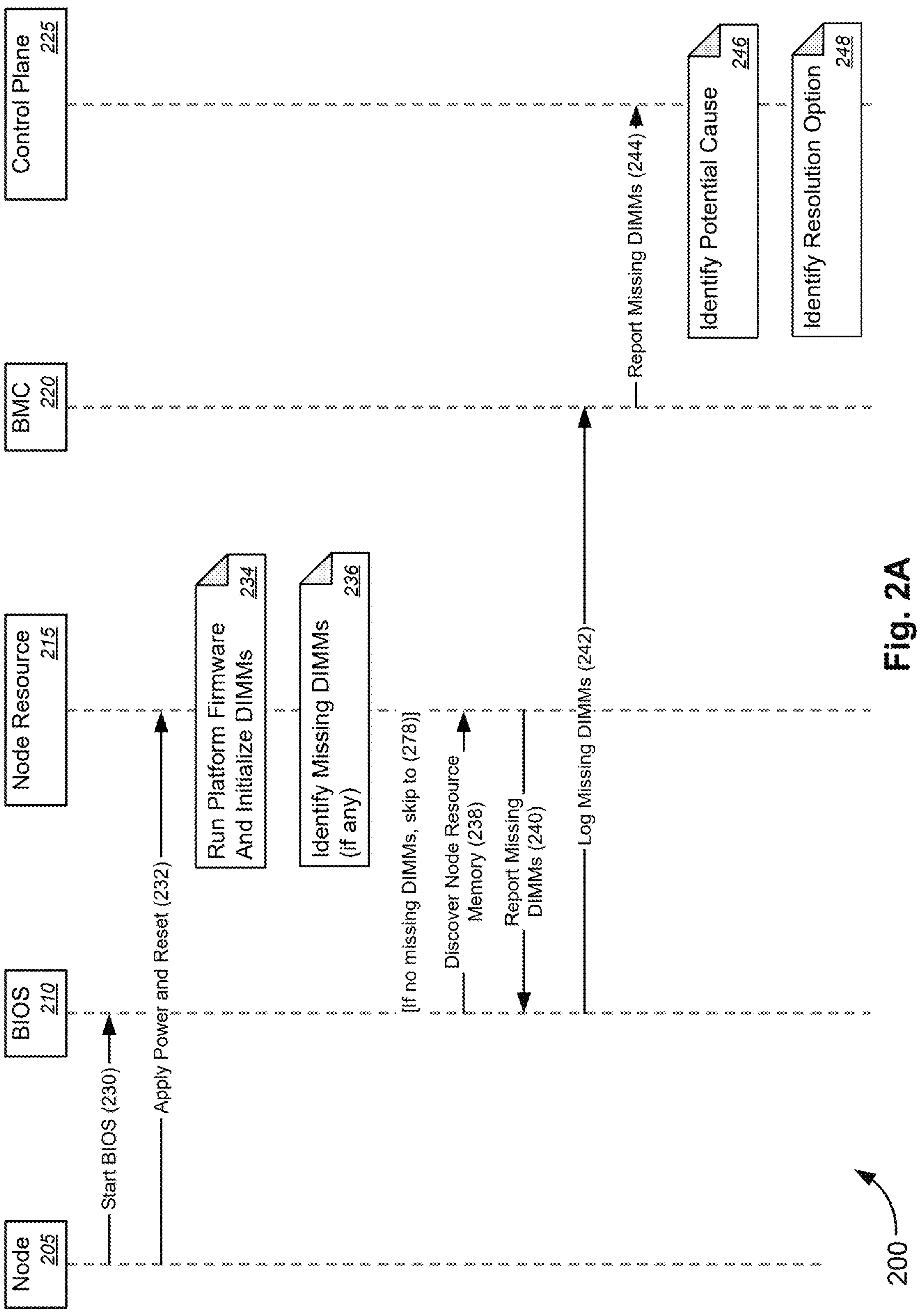
FIGS. 2A-2C depict an example sequence flow for implementing automatic recovery of node resource memory devices.
Figure 2B:
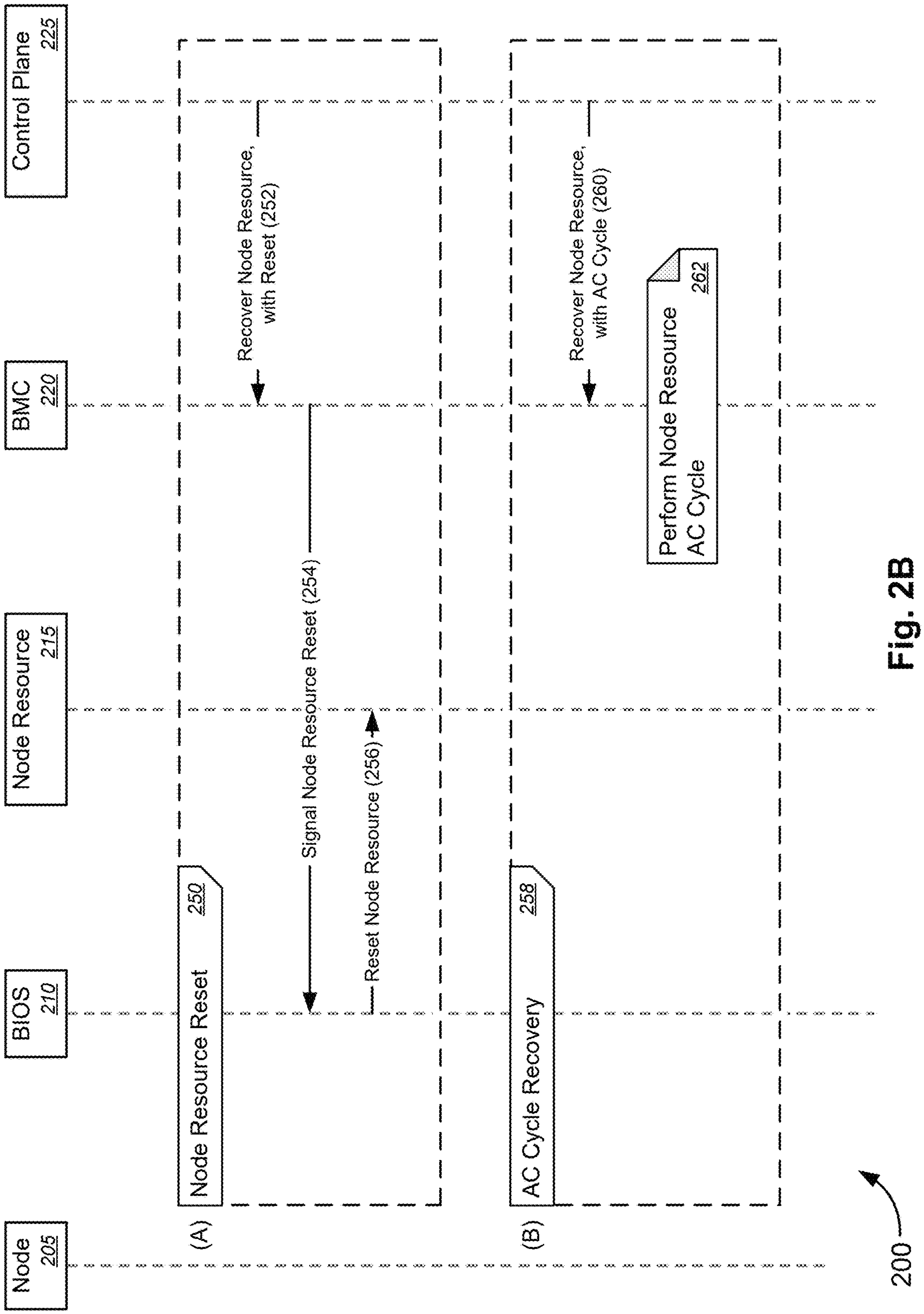
Figure 2C:
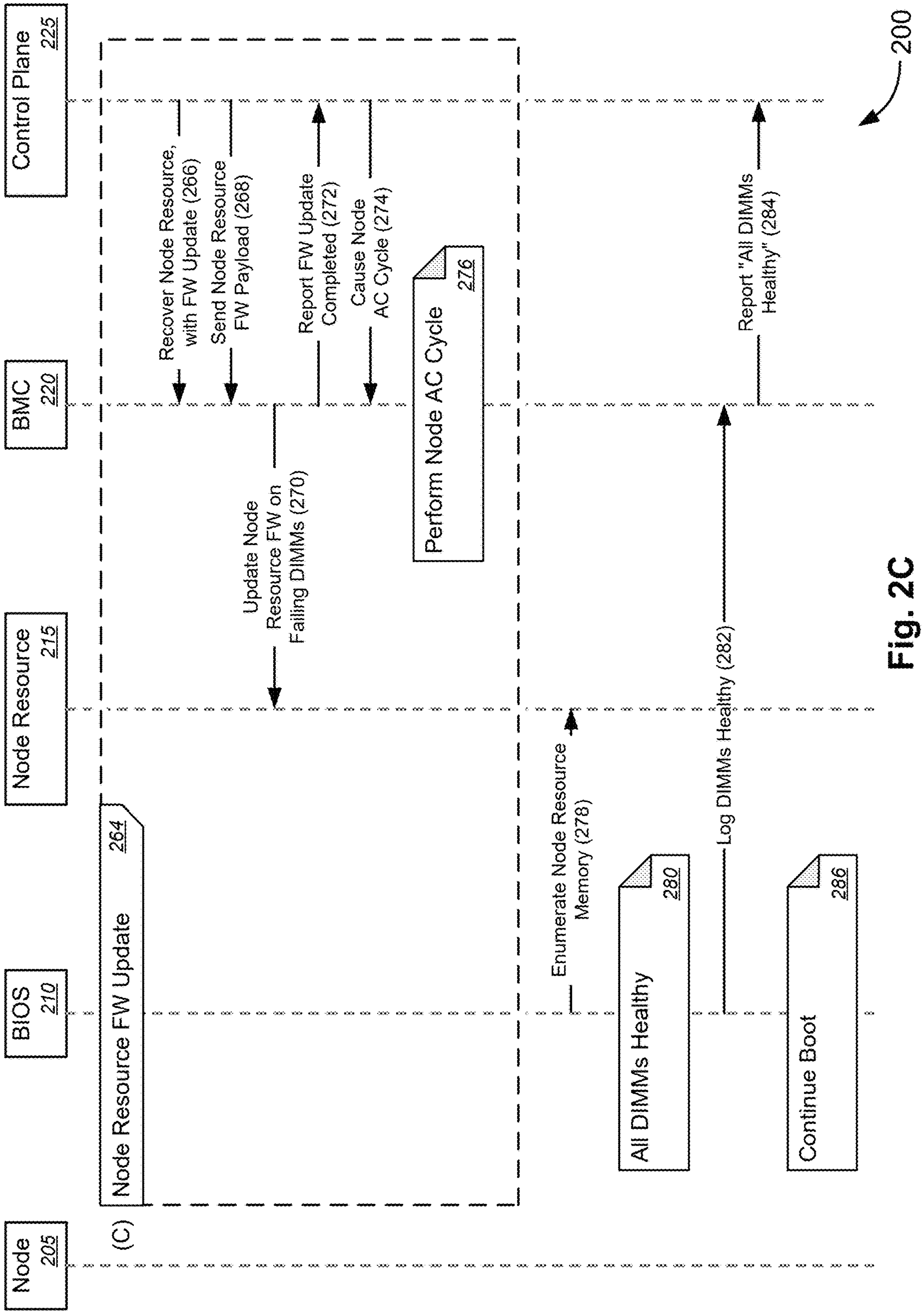

FIGS. 2A-2C depict an example sequence flow 200 for implementing automatic recovery of node resource memory devices. The example sequence flow 200 includes processes performed by a node 205, a BIOS 210, a node resource 215, a BMC 220, and a control plane 225 (e.g., a CPF agent of the control plane). In examples, the node 205, the BIOS 210, the node resource 215, the BMC 220, and the control plane 225 of FIGS. 2A-2C may be similar, if not identical, to the node 105, the platform firmware 130, the node resource 110, the controller or BMC 165, and the control plane 185 (e.g., CPF agent 170), respectively, of system 100 of FIG. 1, and the description of these components of system 100 of FIG. 1 are similarly applicable to the corresponding components of FIGS. 2A-2C.

Referring to FIG. 2A, at operation 230, the node 205 starts the BIOS 210 or platform firmware. At operation 232, the node 205 applies power to and resets the node resource 215. At operation 234, the node resource 215 runs the platform firmware or BIOS 210 and initializes DIMMs (e.g., memory components 125*a*-125*n* of memory device 120 of FIG. 1) that are communicatively coupled with a memory controller of the node resource 215 (e.g., memory controller 135 of node resource 110 of FIG. 1). At operation 236, the node resource 215 identifies missing DIMMs (if any). In some examples, the node resource 215 also identifies recovery steps for recovering the missing DIMMs. If at least one DIMM is identified as being missing, the example sequence flow 200 continues onto the process at operation 238. If all known DIMMs of the node resource memory are detected (e.g., with no missing or undetected DIMMs), the example sequence flow 200 skips to the process at operation 278 in FIG. 2C. At operation 238, the BIOS 210 discovers node resource memory (e.g., memory devices 120 and/or memory components 125*a*-125*n* of FIG. 1). At operation 240, the node resource 215 reports the missing DIMMs as identified at operation 236. In examples, in the case that recovery steps are also identified, the node resource 215 also reports the recovery steps when reporting the missing DIMMs (at operation 240). At operation 242, the BIOS 210 logs the missing DIMMS, such as in a system event log (e.g., SEL 195 of FIG. 1) and/or in an SPI flash (e.g., SPI flash 160 of FIG. 1). In the case that the recovery steps have been reported when reporting the missing DIMMs, the BIOS 210 also logs the recovery steps when logging the missing DIMMs (at operation 242).

At operation 244, the BMC 220 reports the missing DIMMS to the control plane 225 (in some cases, to the CPF agent). In the case that the recovery steps have been logged when logging the missing DIMMs, the BMC 220 also reports the recovery steps to the control plane 225. At operation 246, the control plane 225 (or the CPF agent in particular) identifies a potential cause of the missing DIMMs, in some cases based on an analysis of information contained in the reporting of the missing DIMMs (from operation 244). At operation 248, the control plane 225 (or the CPF agent in particular) identifies a resolution option among a plurality of resolution options to pursue, in some cases based on an analysis of information contained in the reporting of the missing DIMMs (from operation 244) and/or based on the identified potential cause of the missing DIMMs (from operation 246). In the case that the recovery steps are also reported to the control plane 225, identifying the resolution option is further or alternatively based on the recovery steps. In examples, the plurality of resolution options includes:

(1) causing the node resource memory (e.g., memory device 120 of FIG. 1) to restart and to initiate an immediate reset of the DIMMs;

(2) causing the node resource memory to restart and to initiate an immediate retraining of the DIMMs;

(3) causing a firmware update of the node resource memory, followed by restarting of the node resource memory;

(4) causing the node resource itself to restart and to initiate an immediate reset of the node resource;

(5) causing the node resource to restart and to initiate an immediate retraining of the DIMMs coupled to the node resource; and/or (6) causing a firmware update of the node resource, followed by restarting of the node resource.

Referring to FIGS. 2B and 2C, resolution option (A) node resource reset 250 (including operations 252-256) corresponds to resolution options (1) or (4), while resolution option (B) alternating current ("AC") cycle recovery 258 (including operations 260 and 262) corresponds to resolution options (2) or (5), and resolution option (C) node resource firmware update 264 (including operations 266-276) corresponds to resolution options (3) or (6).

Turning to FIG. 2B, when resolution option (A) has been identified, node resource reset 250 is implemented as follows. At operation 252, the control plane 225 (or the CPF agent in particular) instructs the BMC 220 to recover the node resource 215, with a reset. At operation 254, the BMC 220 sends a signal to the BIOS 210 that causes the BIOS 210 to reset the node resource 215. At operation 256, the BIOS 210 causes the BIOS 210 to reset the node resource 215.

Alternatively, when resolution option (B) has been identified, AC cycle recovery 258 is implemented as follows. At operation 260, the control plane 225 (or the CPF agent in particular) instructs the BMC 220 to recover the node resource 215, with an AC cycle. At operation 262, the BMC 220 performs a node resource AC cycle, in which the AC power to the node resource 215 is shut off and subsequently restarted, followed by immediate reset and retraining of the DIMMs.

With reference to FIG. 2C, when resolution option (C) has been identified, node resource firmware update 264 is implemented as follows. At operation 266, the control plane 225 (or the CPF agent in particular) instructs the BMC 220 to recover the node resource 215, with a firmware update. At operation 268, the control plane 225 (or the CPF agent in particular) sends a firmware payload to the node resource 215. At operation 270, the BMC 220 updates the firmware of the node resource on at least the failing DIMMs, if not on all the DIMMs communicatively coupled to the node resource 215. At operation 272, the BMC 220 reports to the control plane 225 that the firmware update has been completed. At operation 274, the control plane 225 (or the CPF agent in particular) instructs the BMC 220 to cause a node AC cycle. At operation 276, the BMC 220 performs a node AC cycle, in which the AC power to the node 205 (including the node resource 215) is shut off and subsequently restarted, followed by immediate reset and retraining of the DIMMs.

At operation 278, following the resolution option (A), (B), or (C), the BIOS 210 enumerates node resource memory (similar to discovery of the node resource memory at operation 238 in FIG. 2A). At operation 280, the BIOS 210 determines that all (known) DIMMs are healthy, based on the enumeration of the node resource memory (at operation 278). At operation 282, the BIOS 210 logs the healthy DIMMs, such as in the system event log (e.g., SEL 195) and/or in the SPI flash (e.g., SPI flash 160). At operation 284, the BMC 220 reports to the control plane 225 that all DIMMs are healthy. At operation 286, the BIOS 210 continues to boot.

These and other functions of the example 200 (and its components) are described in greater detail herein with respect to FIGS. 1, 3, and 4A-4C.

Figure 3:
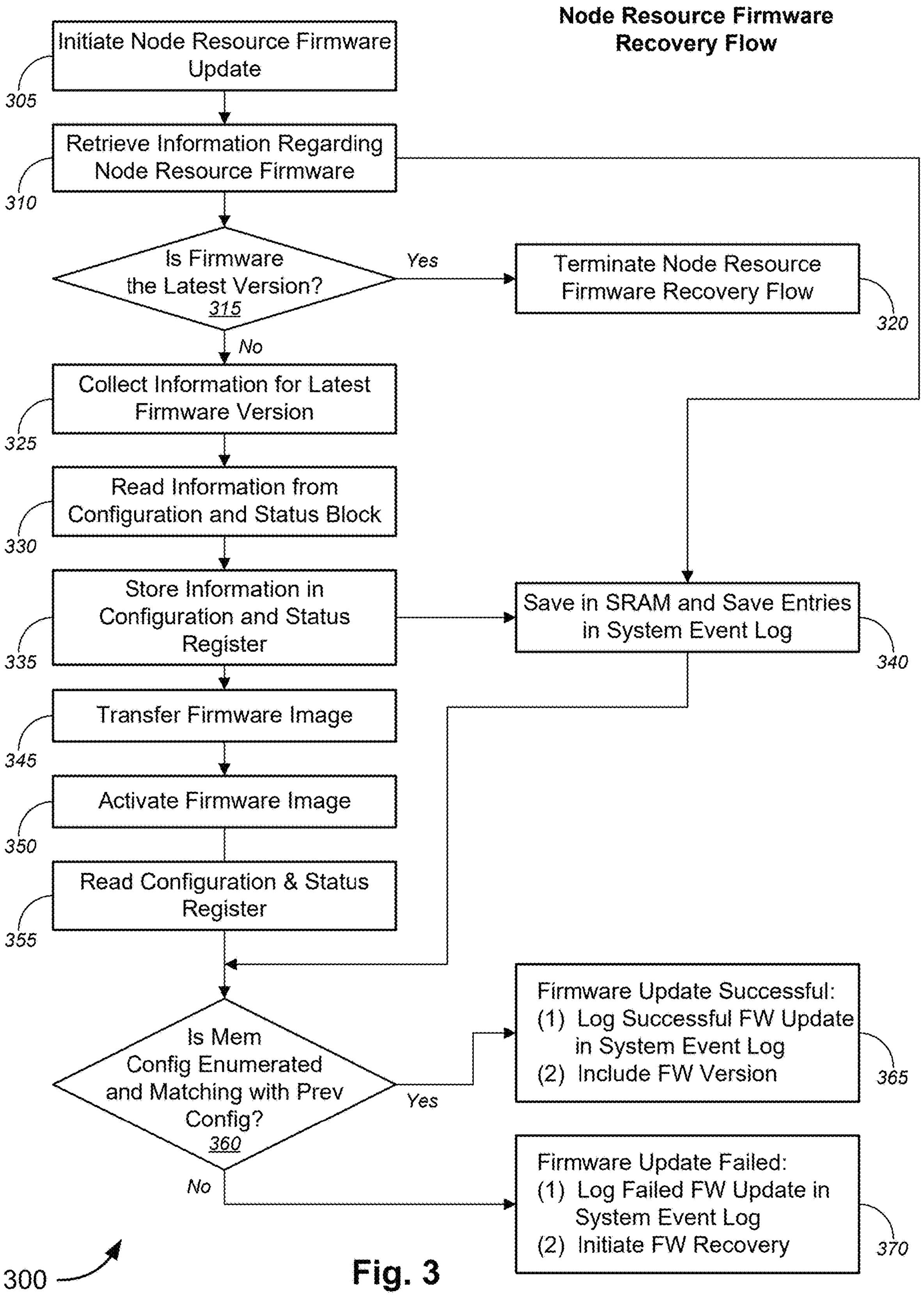
FIG. 3 depicts an example sequence flow for node resource firmware recovery flow when implementing automatic recovery of node resource memory devices.

FIG. 3 depicts an example sequence flow 300 for node resource firmware recovery flow when implementing automatic recovery of node resource memory devices. In examples, the operations of example sequence flow 300 may be performed by a controller or BMC (e.g., controller 165 or BMC 220 of FIGS. 1 and 2A-2C).

In the example sequence flow 300 of FIG. 1, at operation 305, a controller initiates a node resource firmware update. At operation 310, the controller retrieves information regarding the node resource firmware. Example sequence flow 300 either continues onto the process at operation 315 or continues onto the process at operation 340. At operation 315, the controller determines whether the node resource firmware is the latest version. Based on a determination that the node resource firmware is the latest version, the controller terminates the node resource firmware recovery flow (at operation 320). Based on a determination that the node resource firmware is not the latest version, the controller collects information for the latest firmware version (at operation 325). The controller reads information from a Configuration and Status Block (at operation 330), the information includes at least one of:

(a) configuration of a memory components (e.g., memory components 125*a*-125*n* of FIG. 1, such as DIMMs) per memory controller (e.g., memory controller 135 of FIG. 1);

(b) a type of memory component (e.g., an unbuffered or unregistered DIMM ("UDIMM"), a registered DIMM ("RDIMM"), or a load reduced DIMM ("LRDIMM"));

(c) a memory component density (e.g., 16 GB, 32 GB, or 64 GB, and so on); and/or (d) a memory rank (e.g., single rank ("SR"), a dual rank ("DR"), or a quad rank ("QR")).

At operation 335, the controller stores the information in a Configuration and Status Register (e.g., Configuration and Status Register 150 of FIG. 1). The example sequence flow 300 either continues onto the process at operation 340 or continues onto the process at operation 345. At operation 340, the controller saves the information obtained at operations 310, 325, and/or 330 in an SRAM or other memory (e.g., SRAM 190 of FIG. 1) and saves entries in a system event log (e.g., SEL 195 of FIG. 1). The example sequence flow 300 continues onto the process at operation 360. At operation 345, the controller transfers a firmware image, and activates the firmware image (at operation 350). At operation 355, the controller reads the Configuration and Status Register. At operation 360, the controller determines whether the configuration of the memory components is enumerated and whether the configuration matches a previous configuration. Based on a determination that the configuration of the memory components is enumerated and matches a previous configuration, the firmware update is deemed to be successful, and the controller logs the successful firmware update in the system event log, and includes the firmware version (at operation 365). On the other hand, based on a determination either that the configuration of the memory components is not enumerated and/or that the configuration does not match a previous configuration, the firmware update is deemed to have failed, and the controller logs the failed firmware update in the system event log, and initiates firmware recovery (at operation 370).

Figure 4A:
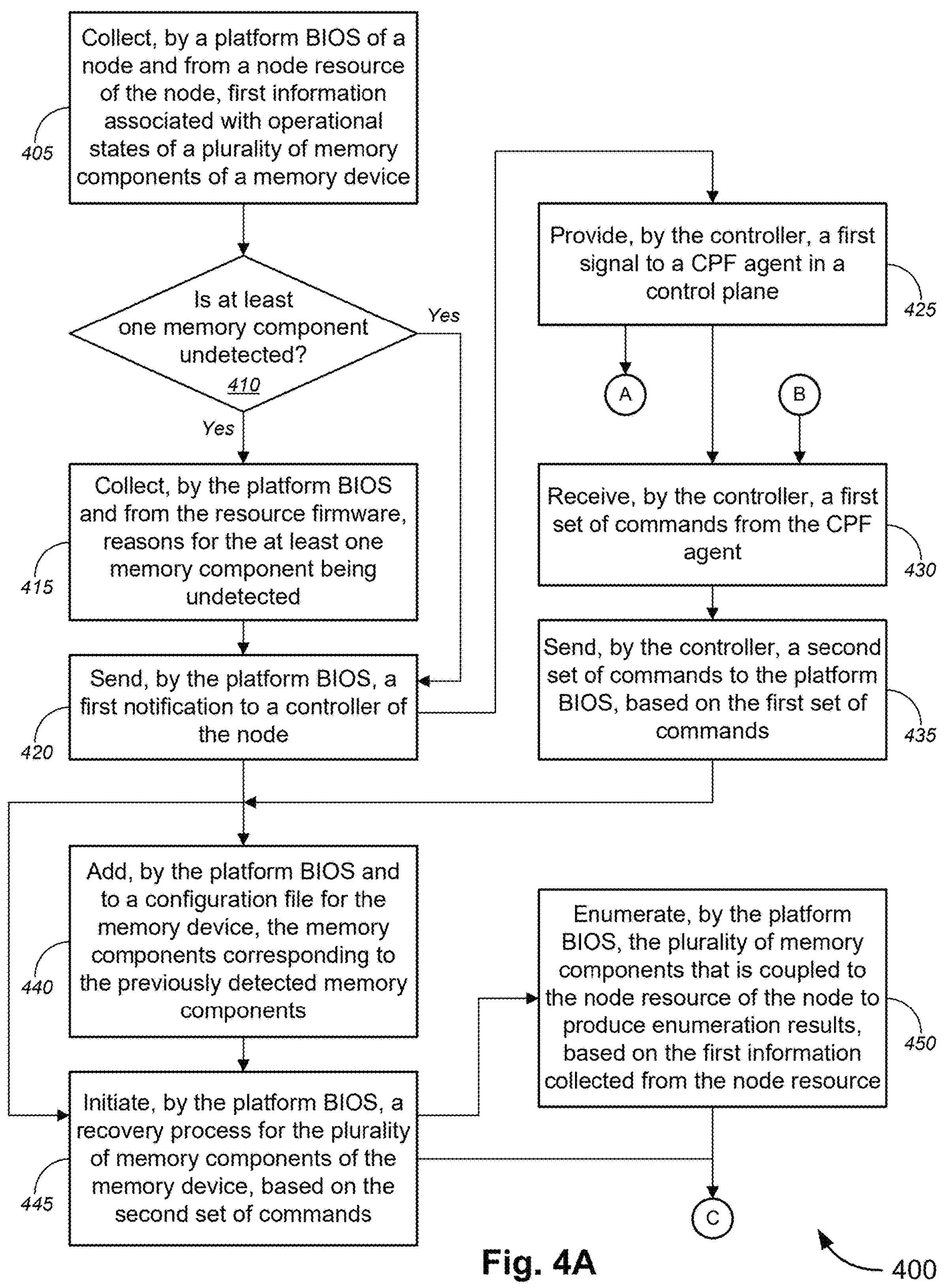
FIGS. 4A-4C depict an example method for implementing automatic recovery of node resource memory devices.
Figure 4B:
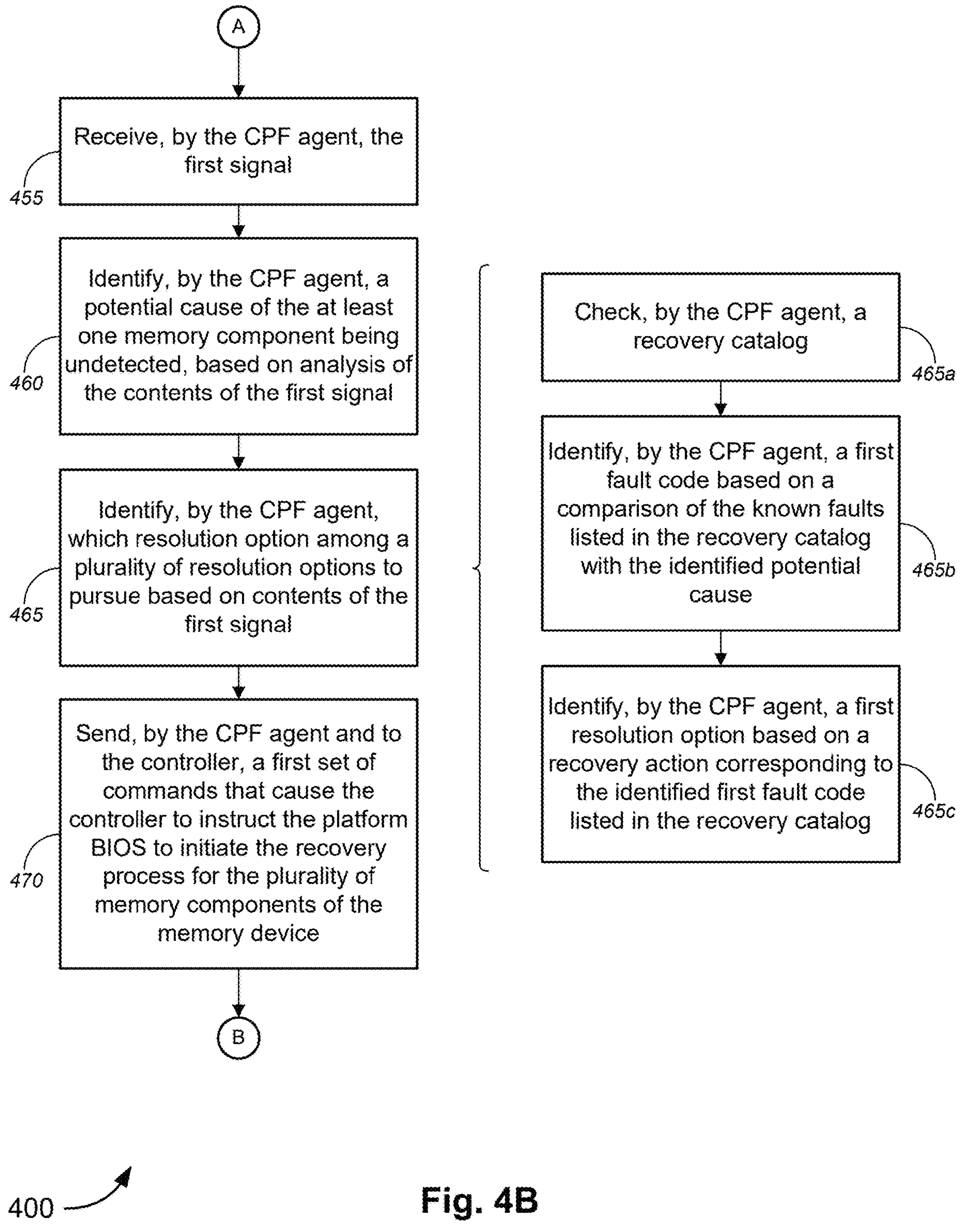
Figure 4C:
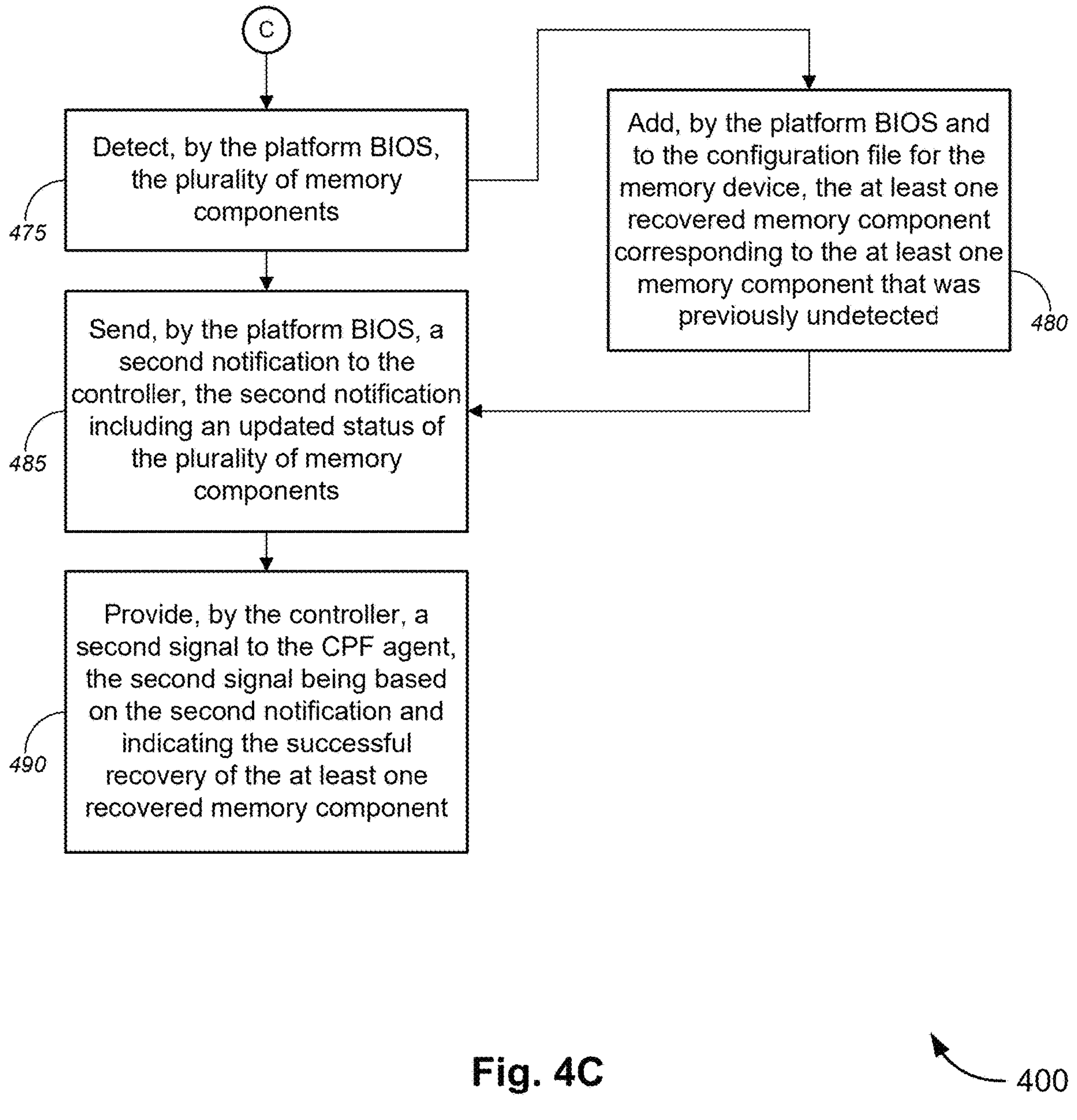

FIGS. 4A-4C depict an example method 400 for implementing automatic recovery of node resource memory devices. In examples, the operations of example method 400 may be performed by a platform BIOS (e.g., platform firmware 130 or BIOS 210 of FIGS. 1 and 2A-2C), a controller or BMC (e.g., controller 165 or BMC 220 of FIGS. 1 and 2A-2C), and/or a CPF agent (e.g., CPF agent 170 or control plane 225 of FIGS. 1 and 2A-2C). Method 400 of FIG. 4A continues onto FIG. 4B following the circular marker denoted, "A," and returns to FIG. 4A following the circular marker denoted, "B." Method 400 of FIG. 4A continues onto FIG. 4C following the circular marker denoted, "C."

In the example method 400 of FIG. 4A, at operation 405, a platform BIOS of a node (e.g., node 105 of FIG. 1) collects, from a node resource of the node (e.g., node resource 110 of node 105 of FIG. 1), first information associated with operational states (e.g., health data) of a plurality of memory components of a memory device (e.g., memory components **125*a*-125*n* of memory device 120 of FIG. 1). At operation 410, the platform BIOS determines whether at least one memory component among the plurality of memory components is undetected, in some cases, by comparing the first information with second information associated with a resource inventory corresponding to the plurality of memory components of the memory device. Based on a determination that at least one memory component is undetected, method 400 either continues onto the process at operation 415 or continues onto the process at operation 420. At operation 415, the platform BIOS collects, from the resource firmware (e.g., platform firmware 130 of FIG. 1), reasons for the at least one memory component being undetected. Method 400 continues onto the process at operation 420. At operation 420, the platform BIOS sends a first notification to a controller (e.g., a BMC) of the node, the first notification indicating that the at least one memory component is undetected. Method 400 either continues onto the process at operation 425, continues onto the process at operation 440, and/or continues onto the process at operation 445**.

At operation 425, the controller of the node provides a first signal to a CPF agent in a control plane, the first signal being based on the first notification and indicating that the at least one memory component is undetected. Method 400 either continues onto the process at operation 430 or continues onto the process at 455 in FIG. 4B, following the circular marker denoted, “A,” and returning to the process at 430 in FIG. 4A, following the circular marker denoted, “B.” At operation 430, the controller receives a first set of commands from the CPF agent, the first set of commands being based on a determination by the CPF agent regarding resolution to the at least one memory component being undetected. In some examples, providing the first signal to the CPF agent (at operation 425) includes the controller logging contents of the first notification in a telemetry log that is accessible by the CPF agent. In examples, the determination by the CPF agent regarding the resolution to the at least one memory component being undetected is based on the contents of the first notification that is accessed from the telemetry log by the CPF agent. At operation 435, the controller sends a second set of commands to the platform BIOS, based on the first set of commands. Method 400 either continues onto the process at operation 440 and/or continues onto the process at operation 445.

At operation 440, the platform BIOS adds, to a configuration file for the memory device, the memory components corresponding to the previously detected memory components. Method 400 continues onto the process at operation 445. At operation 445, the platform BIOS initiates a recovery process for the plurality of memory components of the memory device, in some cases, based on the second set of commands. Method 400 either continues onto the process at operation 450 or continues onto the process at 470 in FIG. 4C following the circular marker denoted, “C.” At operation 450, the platform BIOS enumerates the plurality of memory components that is coupled to the node resource of the node to produce enumeration results, based on the first information collected from the node resource. In examples, the enumeration results indicate at least one of a number of operational memory components or a number of detectable memory components, among the plurality of memory components. In some examples, enumerating the plurality of memory components (at operation 450) is performed after the node has booted up, after the node resource has powered up, and after the node resource has started running a resource firmware. In some cases, the memory device is initialized by the resource firmware.

At operation 455 in FIG. 4B (following the circular marker denoted, “A,” in FIG. 4A), method 400 includes the CPF agent receives the first signal. At operation 460, the CPF agent identifies a potential cause of the at least one memory component being undetected, in some cases, based on analysis of the contents of the first signal and/or based on the reasons for the at least one memory component being undetected (as collected from the resource firmware at operation 415). At operation 465, the CPF agent identifies which resolution option among a plurality of resolution options to pursue based on contents of the first signal. In examples, the plurality of resolution options includes:

(1) causing the memory device to restart and to initiate an immediate reset of the plurality of memory components;

(2) causing the memory device to restart and to initiate an immediate retraining of the plurality of memory components;

(3) causing a firmware update of the memory device, followed by restarting of the memory device;

(4) causing the node resource to restart and to initiate an immediate reset of the node resource;

(5) causing the node resource to restart and to initiate an immediate retraining of the plurality of memory components coupled to the node resource; and/or (6) causing a firmware update of the node resource, followed by restarting of the node resource.

In some examples, identifying which resolution option to pursue (at operation 465) includes the CPF agent checking a recovery catalog, the recovery catalog including a list of fault codes correlated with known faults and corresponding recovery actions (at operation **465*a*). Identifying which resolution option to pursue (at operation 465) further includes the CPF agent identifying a first fault code based on a comparison of the known faults listed in the recovery catalog with the identified potential cause (at operation 465*b*); and identifying a first resolution option based on a recovery action corresponding to the identified first fault code listed in the recovery catalog (at operation 465*c*). At operation 470, the CPF agent sends, to the controller, a first set of commands that cause the controller to instruct the platform BIOS to initiate the recovery process for the plurality of memory components of the memory device, in some cases, based on the first resolution option (from operation 465*c*). Method 400 returns to the process at 430 in FIG. 4**A, following the circular marker denoted, “B.”

At operation 475 in FIG. 4C (following the circular marker denoted, “C,” in FIG. 4A), method 400 includes the platform BIOS detecting the plurality of memory components. In examples, the plurality of memory components includes memory components corresponding to previously detected memory components and at least one recovered memory component corresponding to the at least one memory component that was previously undetected. Method 400 either continues onto the process at operation 480 or continues onto the process at operation 485. At operation 480, the platform BIOS adds, to the configuration file for the memory device, the at least one recovered memory component corresponding to the at least one memory component that was previously undetected. Method 400 continues onto the process at operation 485. At operation 485, the platform BIOS sends a second notification to the controller, the second notification including an updated status of the plurality of memory components. In examples, the updated status indicates successful recovery of the at least one recovered memory component. At operation 490, the controller provides a second signal to the CPF agent, the second signal being based on the second notification and indicating the successful recovery of the at least one recovered memory component.

While the techniques and procedures in method 400 is depicted and/or described in a certain order for purposes of illustration, it should be appreciated that certain procedures may be reordered and/or omitted within the scope of various embodiments. Moreover, while the method 400 may be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 (e.g., by executing instructions embodied on a computer readable medium), the systems, examples, or embodiments 100, 200, and 300 of FIGS. 1, 2, and 3 can each also operate according to other modes of operation and/or perform other suitable procedures.

As should be appreciated from the foregoing, the present technology provides multiple technical benefits and solutions to technical problems. For instance, provisioning memory interface technologies and system architectures necessitates storing and processing increasing amounts of data, which generally raises technical problems. For example, one technical problem includes all memory devices, which are hosted by a node resource (e.g., a compute express link ("CXL") resource, a compute resource, or a memory resource) of a node in a data center, being disabled when there is an issue with at least one memory device hosted by the node resource. The node subsequently boots with a reduced capacity, which causes a repair state condition in which the node is shut down and awaiting diagnosis and repair by a service provider agent or technician. This leads to reductions in overall resource capacity.

The present technology provides for automatic recovery of node resource memory devices. In the various examples, a CPF agent-assisted automatic recovery of failing node resource memory components and/or failing node resource is provided, where the CPF agent analyzes or decodes health signals and/or health data (e.g., as telemetry data) of the node resource memory devices and/or the node resource, received from a platform firmware (e.g., platform BIOS). The CPF agent determines recovery actions to recover the failing node resource memory components based on the health signals and/or health data, and sends instructions to the platform firmware. The recovery actions include resetting the failing node resource memory components and/or failing node resource, with or without training of the node resource memory components after reset. The recovery actions further include updating firmware of the failing node resource memory components and/or failing node resource, in some cases, followed by reset with training. In this manner, resource capacity of the node resources is maintained (e.g., with prolonged reduced capacity being avoided), while overall system efficiencies are increased. Further, in addition to the overall system efficiencies being increased, reliability of the node resources, of the memory components hosted on the node resources, and/or of the overall system is enhanced.

Figure 5:
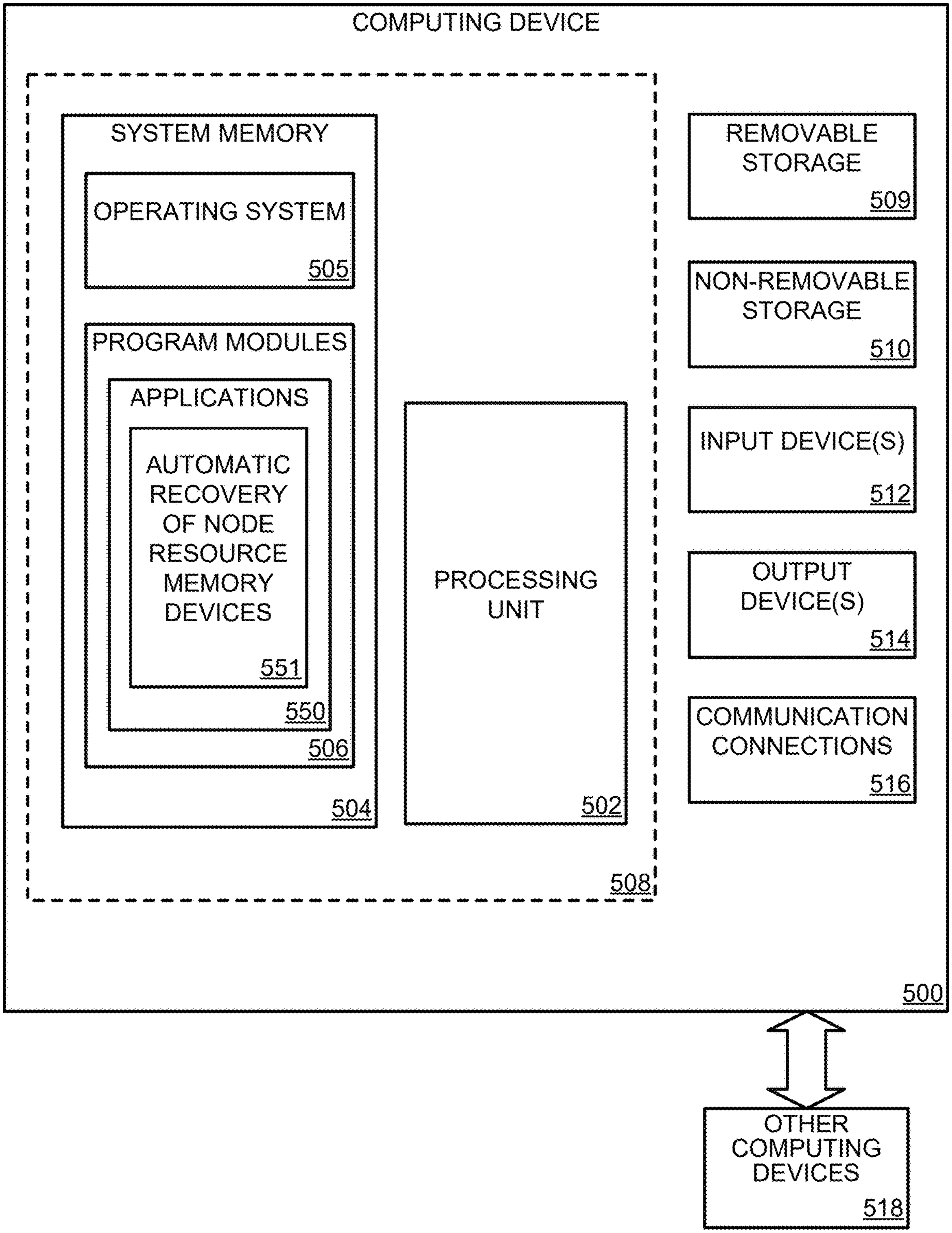
FIG. 5 depicts a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the automatic recovery of node resource memory devices, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as automatic recovery of node resource memory devices 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including one or more of the operations of the method(s) as illustrated in FIG. 4A-4C, or one or more operations of the system(s) and/or apparatus(es) as described with respect to FIG. 1-3, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:
a node, comprising:
a node resource;
a memory device communicatively coupled to and controlled by the node resource, the memory device comprising a plurality of memory components; and
a platform basic input/output system ("BIOS") that executes first code that causes the platform BIOS to perform first operations comprising:
collecting, from the node resource, first information associated with operational states of the plurality of memory components of the memory device;
determining whether at least one memory component among the plurality of memory components is undetected, by comparing the first information with second information associated with a resource inventory corresponding to the plurality of memory components of the memory device;
based on a determination that at least one memory component is undetected, sending a first notification to a controller of the node, the first notification indicating that the at least one memory component is undetected; and
initiating a recovery process for the plurality of memory components of the memory device, based on a first set of commands received from the controller, the first set of commands being based on a correlation between recovery options and a potential cause of the at least one memory component being undetected that is determined by a control plane fabric ("CPF") agent in a control plane, wherein the recovery process includes pursuing a resolution option among a plurality of resolution options, wherein the plurality of resolution options includes at least one of:
causing the memory device to restart and to initiate an immediate reset of the plurality of memory components;
causing the memory device to restart and to initiate an immediate retraining of the plurality of memory components;
causing a firmware update of the memory device, followed by restarting of the memory device;
causing the node resource to restart and to initiate an immediate reset of the node resource;
causing the node resource to restart and to initiate an immediate retraining of the plurality of memory components coupled to the node resource; or
causing a firmware update of the node resource, followed by restarting of the node resource.

2. The system of claim 1, wherein the first operations further comprise:
enumerating the plurality of memory components that is coupled to the node resource of the node to produce enumeration results, based on the first information collected from the node resource, the enumeration results indicating at least one of a number of operational memory components or a number of detectable memory components, among the plurality of memory components.

3. The system of claim 2, wherein enumerating the plurality of memory components is performed after the node has booted up, after the node resource has powered up, and after the node resource has started running a resource firmware, wherein the memory device is initialized by the resource firmware.

4. The system of claim 1, further comprising:
the controller, which executes second code that causes the controller to perform second operations comprising:
providing a first signal to the CPF agent in the control plane, the first signal being based on the first notification and indicating that the at least one memory component is undetected;
receiving the first set of commands from the CPF agent; and
sending a second set of commands to the platform BIOS, based on the first set of commands.

5. The system of claim 4,
wherein the first operations further comprise:
after initiating the recovery process, detecting the plurality of memory components, the plurality of memory components including memory components corresponding to previously detected memory components and at least one recovered memory component corresponding to the at least one memory component that was previously undetected; and
sending a second notification to the controller, the second notification including an updated status of the plurality of memory components, the updated status indicating successful recovery of the at least one recovered memory component; and
wherein the second operations further comprise:
providing a second signal to the CPF agent, the second signal being based on the second notification and indicating successful recovery of the at least one recovered memory component.

6. The system of claim 4, further comprising:
the CPF agent the control plane, which executes third code that causes the CPF agent to perform third operations comprising:
identifying the potential cause of the at least one memory component being undetected, based on analysis of contents of the first signal that is provided by the controller;
checking a recovery catalog, the recovery catalog including a list of fault codes correlated with known faults and corresponding recovery actions;

identifying a first fault code based on a comparison of the known faults listed in the recovery catalog with the identified potential cause; and identifying the first resolution option, among the plurality of resolution options, based on a recovery action corresponding to the identified first fault code listed in the recovery catalog.

7. The system of claim 6, wherein the first operations further comprise:

further based on the determination that the at least one memory component is undetected, collecting, from a resource firmware, reasons for the at least one memory component being undetected.

8. The system of claim 7, wherein identifying the potential cause of the at least one memory component being undetected is further based on the reasons for the at least one memory component being undetected, as collected from the resource firmware.

9. The system of claim 1, wherein the node resource includes one of a compute resource or a memory resource, wherein the compute resource includes at least one of a graphics processing unit ("GPU")-based resource, a central processing unit ("CPU")-based resource, a neural processing unit ("NPU")-based resource, or a smart network interface card ("SmartNIC")-based resource, wherein the memory resource includes at least one of a random access memory ("RAM")-based resource, a dual in-line memory module ("DIMM")-based resource, or a high bandwidth memory ("HBM")-based resource.

10. A computer-implemented method, comprising:

collecting, by a platform basic input/output system ("BIOS") of a node and from a node resource of the node, first information associated with operational states of a plurality of memory components of a memory device;

determining, by the platform BIOS, whether at least one memory component among the plurality of memory components is undetected, by comparing the first information with second information associated with a resource inventory corresponding to the plurality of memory components of the memory device;

based on a determination that at least one memory component is undetected, sending, by the platform BIOS, a first notification to a controller of the node, the first notification indicating that the at least one memory component is undetected;

providing, by the controller, a first signal to a control plane fabric ("CPF") agent in a control plane, the first signal being based on the first notification and indicating that the at least one memory component is undetected;

receiving, by the controller, a first set of commands from the CPF agent, the first set of commands being based on a determination by the CPF agent regarding resolution to the at least one memory component being undetected, wherein the determination by the CPF agent regarding the resolution to the at least one memory component being undetected is based on identifying which resolution option among a plurality of resolution options to pursue, wherein the plurality of resolution options includes at least one of:

causing the memory device to restart and to initiate an immediate reset of the plurality of memory components;

causing the memory device to restart and to initiate an immediate retraining of the plurality of memory components;

causing a firmware update of the memory device, followed by restarting of the memory device;

causing the node resource to restart and to initiate an immediate reset of the node resource;

causing the node resource to restart and to initiate an immediate retraining of the plurality of memory components coupled to the node resource; or causing a firmware update of the node resource, followed by restarting of the node resource;

sending, by the controller, a second set of commands to the platform BIOS, based on the first set of commands; and initiating, by the platform BIOS, a recovery process for the plurality of memory components of the memory device, based on the second set of commands.

11. The computer-implemented method of claim 10, further comprising:

enumerating, by the platform BIOS, the plurality of memory components that is coupled to the node resource of the node to produce enumeration results, based on the first information collected from the node resource, the enumeration results indicating at least one of a number of operational memory components or a number of detectable memory components, among the plurality of memory components.

12. The computer-implemented method of claim 11, wherein enumerating the plurality of memory components is performed after the node has booted up, after the node resource has powered up, and after the node resource has started running a resource firmware, wherein the memory device is initialized by the resource firmware.

13. The computer-implemented method of claim 12, further comprising:

further based on the determination that the at least one memory component is undetected, collecting, by the platform BIOS and from the resource firmware, reasons for the at least one memory component being undetected.

14. The computer-implemented method of claim 10, wherein providing the first signal to the CPF agent comprises logging, by the controller, contents of the first notification in a telemetry log that is accessible by the CPF agent, wherein the determination by the CPF agent regarding the resolution to the at least one memory component being undetected is based on the contents of the first notification that is accessed from the telemetry log by the CPF agent.

15. The computer-implemented method of claim 10, further comprising: identifying, by the CPF agent, a potential cause of the at least one memory component being undetected, based on analysis of the contents of the first signal; wherein identifying which resolution, option to pursue includes: checking, by the CPF agent, a recovery catalog, the recovery catalog including a list of fault codes correlated with known faults and corresponding recovery actions; identifying, by the CPF agent, a first fault code based on a comparison of the known faults listed in the recovery catalog with the identified potential cause; and identifying, by the CPF agent, a first resolution option based on a recovery action corresponding to the identified first fault code listed in the recovery catalog.

16. The computer-implemented method of claim 10, further comprising:

after initiating the recovery process, detecting, by the platform BIOS, the plurality of memory components, the plurality of memory components including memory components corresponding to previously detected memory components and at least one recovered memory component corresponding to the at least one memory component that was previously undetected;

sending, by the platform BIOS, a second notification to the controller, the second notification including an updated status of the plurality of memory components, the updated status indicating successful recovery of the at least one recovered memory component; and providing, by the controller, a second signal to the CPF agent, the second signal being based on the second notification and indicating the successful recovery of the at least one recovered memory component.

17. The computer-implemented method of claim 16, further comprising:

prior to initiation of the recovery process, adding, by the platform BIOS and to a configuration file for the memory device, the memory components corresponding to the previously detected memory components; and after detecting the plurality of memory components including the at least one recovered memory component, adding, by the platform BIOS and to the configuration file for the memory device, the at least one recovered memory component corresponding to the at least one memory component that was previously undetected.

18. A system, comprising:

a control plane fabric ("CPF") agent in a control plane, the CPF agent executing code that causes the CPF agent to perform operations comprising:

identifying a potential cause of at least one memory component being undetected among a plurality of memory components of a memory device, based on analysis of contents of a first signal that is provided by a controller of a node, the memory device being communicatively coupled to and controlled by a node resource of the node;

checking a recovery catalog, the recovery catalog including a list of fault codes correlated with known faults and corresponding recovery actions;

identifying a first fault code based on a comparison of the known faults listed in the recovery catalog with the identified potential cause;

identifying a first resolution option, among a plurality of resolution options to pursue, based on a recovery action corresponding to the identified first fault code listed in the recovery catalog, wherein the plurality of resolution options includes at least one of:

causing the memory device to restart and to initiate an immediate reset of the plurality of memory components;

causing the memory device to restart and to initiate an immediate retraining of the plurality of memory components;

causing a firmware update of the memory device, followed by restarting of the memory device;

causing the node resource to restart and to initiate an immediate reset of the node resource;

causing the node resource to restart and to initiate an immediate retraining of the plurality of memory components coupled to the node resource; or causing a firmware update of the node resource, followed by restarting of the node resource; and sending, to the controller, a first set of commands that cause the controller to instruct a platform basic input/output system ("BIOS") of the node to initiate a recovery process for the plurality of memory components of the memory device, based on the first resolution option.

19. The system of claim 18, further comprising:

a platform Basic Input/Output System (BIOS) that provides, to the controller, a notification indicating that the memory component is undetected.

20. The system of claim 18, wherein providing the first signal to the CPF agent includes the controller logging contents of the notification in a telemetry log that is accessible by the CPF agent.

* * * * *